M. F. GRIMM.
LOCKING DEVICE FOR STEERING WHEELS.
APPLICATION FILED JULY 30, 1917.
1,266,935.
Patented May 21, 1918.
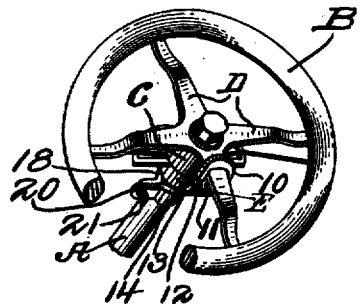
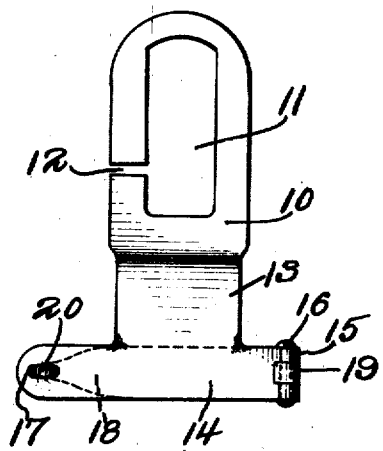
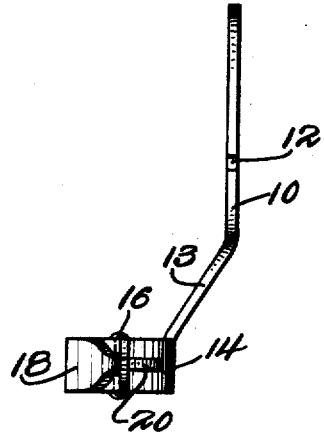
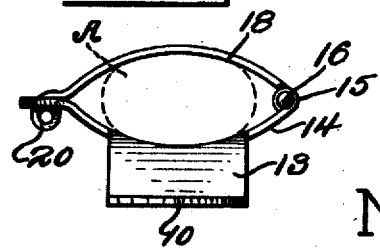
Inventor
M. F. Grimm.

UNITED STATES PATENT OFFICE.

MAX F. GRIMM, OF SAN ANTONIO, TEXAS.

LOCKING DEVICE FOR STEERING-WHEELS.

1,266,935.

Specification of Letters Patent.

Patented May 21, 1918.

Application filed July 30, 1917. Serial No. 183,574.

*To all whom it may concern:*

Be it known that I, MAX F. GRIMM, a citizen of the United States, and a resident of San Antonio, in the county of Bexar and State of Texas, have invented a certain new and useful Improvement in Locking Devices for Steering-Wheels, of which the following is a specification.

The present invention relates to an attachment for motor vehicles, and has more particular reference to a locking device for the steering wheels of the vehicle.

An object of the present invention is to provide a device of this character which is of simple construction; which is wholly detachable from the steering column and the steering wheel; which may be quickly applied to the steering wheel and the steering column; and a device which securely holds the steering wheel from turning on the steering column.

The invention further aims at the provision of a device of this character which may be made from sheet metal, which comprises but substantially two parts, and which is adapted to receive a padlock of any suitable construction so that locks of various types may be used as desired.

The above, and various other objects and advantages of this invention will be in part described, and in part understood, from the following detailed description of the present preferred embodiment, the same being illustrated in the accompanying drawing wherein:

Figure 1 is a perspective view of a locking device constructed according to the present invention and as applied to a steering wheel and the column thereof.

Fig. 2 is an enlarged side elevation of the locking device.

Fig. 3 is an edge view of the locking device.

Fig. 4 is a top plan view of the locking device, the dotted lines disclosing a steering column arranged within the same.

Referring to this drawing, A designates a steering column of the usual type, and which is preferably elliptical in cross-section as shown to advantage in Fig. 4. Arranged in the usual manner on the upper end of the steering column A is the steering wheel B, the latter having a hub portion C and radiating arms D. The steering column A is provided on its upper end with a collar or annular shoulder E, in the usual manner.

The locking device comprises a link member adapted to engage the steering wheel B, and a stop member adapted to secure the lower end of the link to the steering column A.

The link member comprises a strap or flat bar 10 having a relatively long wide slot 11 in one end thereof, the upper end, the slot opening 11 opening through one edge of the bar 10 by the provision of a transverse passage or opening 12 formed transversely in the bar at one side of the slot 11. The passage or opening 12 is preferably formed adjacent to the inner or lower end of the slot 11 and is of a width sufficient only to receive one of the steering wheel arms D edgewise therethrough. The slot 11 is of sufficient width to receive the steering arms D upwardly through the slot so that the upper end of the bar or link may be suspended upon the arms. The lower end of the bar 10 is bent laterally at a slight angle to provide an attaching shank 13 which, when the device is in position, is adapted to engage beneath the hub C and approach the lower edge of the collar or shoulder E. The lower end of the shank 13 is provided with a strap portion 14 which extends transversely across the lower end of the shank 13, and which is bent into a plane substantially in parallelism with the plane of the bar 10. The opposite ends of the strap portion 14 extend beyond the lateral edges of the shank 13, and one end of the strap portion 14 is forked and rolled over to provide a pair of hinge eyes 15 through which a pintle 16 engages. The opposite end of the strap portion 14 is provided with a slot or opening 17 which preferably extends longitudinally in the said end portion of the strap. The strap portion 14, and the lower end of the shank 13, are arched outwardly to conform to the side of the steering column A, as shown in Fig. 4, and the strap 14 is adapted to lie flat against said side.

The strap member of the device comprises a length of preferably sheet metal which is provided upon one end with a laterally reduced and lengthwise extending tongue which is overturned to form a hinge eye 19 adapted to engage the pintle 16 and support the strap member 18. The strap member 18 is arched or bowed outwardly in opposite directions to that in which the strap portion 14 is arched, and is adapted to lie flat against the opposite side of the steering column A. The free end portion of the member 18 is laterally reduced and rolled over to form a staple 20 through which a padlock 21, of any adaptable type, is adapted to be secured. The staple 20 registers with the slot 17 and is adapted to project therethrough prior to the securement of the padlock 21 thereto.

The bar 10, and the shank 13, when combined, are of a length sufficient to retain the strap members 14 and 18 immediately beneath the collar E when the device is applied, and the upper edges of the strap portions 14 and 18 are adapted to abut the shoulder E and hold the clamping element from moving upwardly on the steering column A. The clamping element registers beneath the shoulder E only when the arm D of the steering wheel is engaged in the upper closed end of the slot 11, and the clamping element is adapted to hold the link member from moving upwardly, and to retain the link member in such position that the lateral slot or opening 12 in the link is at all times held below the plane of the arm D.

To apply the device to the steering wheel B and column A, it is only necessary to first insert the link member between a pair of the arms D and to raise the link member into a position to register the opening 12 with the edge of one of the arms D. The link is now moved into position to engage the arms through the opening D and into the slot 11. The link 10 is now permitted to fall and the arm D moves into the upper end of the slot 11. The clamping element, comprising the strap members 14 and 18, is now secured upon the steering column A, and owing to the elliptical formation of the steering column A, the clamping element is held from turning thereon. A padlock of any suitable construction, such as indicated at 21, is secured through the staple 20 after the latter has been inserted through the opening 17. The padlock thus holds the straps 14 and 18 from separation. Any tendency to turn the steering wheel B, when the locking device is applied thereto, moves the link to a slight extent and clamps the clamping element upon the steering column A. This action binds the clamping element on the steering column and insures the retention of the steering wheel from rotation.

To release the lock from the steering wheel, it is only necessary to remove the padlock 21 and swing the straps 14 and 18 apart. The link 10 may now be raised sufficiently to register the slot or opening 12 with the inclosed arms, and by a slight lateral movement of the link the same may be disengaged from the steering wheel.

It is of course understood that various changes and modifications may be made in the details of construction of the above specifically described locking device for steering wheels to adapt the same for application to motor vehicles of various types, such changes and modifications being fully contemplated in the spirit of this invention, and being restricted only by the scope of the following claims.

I claim:—

1. A steering wheel lock comprising a pair of pivotally connected jaws adapted to embrace a steering column, one jaw having an upstanding hook with a downwardly extending bill adapted to engage over an arm of the steering wheel, and means for detachably locking the jaws to the steering column to hold the jaws from circumferential and upward movement upon the steering column.

2. In a locking device for steering wheels, the combination of a link having in one end a longitudinal slot opening near its inner extremity through one edge of the link and adapted to receive an arm of the steering wheel through the opening and into the slot, and a clamping element on the lower end of the link adapted to engage a steering column and hold the arm in the upper end of the slot.

3. In a locking device for steering wheels, the combination of a link having an opening in one end and adapted to be hooked over an arm of a steering wheel, a pair of hinged strap members mounted on the lower end of the link and adapted to embrace a steering column, one of said strap members having a slot in its free end and the opposite member having a staple in its free end adapted to enter the slot, and a locking device adapted to engage through the staple to hold the strap members about the steering column.

4. In a locking device for steering wheels, the combination of a link having in one end a longitudinal slot opening between its ends through one edge of the link and adapted to be hooked over an arm of a steering wheel, said link provided upon its opposite end with an arcuate strap member adapted to bear against one side of a steering column, a second strap member hinged at one end to one extremity of said first strap member, and means for locking the free ends of the strap members together about the steering column for holding the link from rising upon said arm.

5. In a locking device for steering wheels, the combination with a steering column elliptical in cross-section and provided with a collar at its upper end, and a steering wheel mounted on the steering column and provided with radiating arms, of a link having an opening in one end adapted to be hooked over one of the arms of said steering wheel and provided upon said end with a strap member adapted to engage against one of the relatively flat sides of the steering column beneath said collar, a second strap member adapted to engage against the opposite side of the steering column beneath the collar, and means for locking said strap members together about the steering column and beneath the collar to retain the link from turning on the steering column and from upward displacement from the arm.

MAX F. GRIMM.